United States Patent [19]

Nozawa et al.

[11] 4,175,846
[45] Nov. 27, 1979

[54] MOTOR-OPERATED FILM WINDING APPARATUS

[75] Inventors: Shiyozo Nozawa; Saburo Hokari, both of Kawasaki; Shigeru Yamaga; Akira Takahashi, both of Tokyo, all of Japan

[73] Assignee: Ricoh Company, Ltd., Japan

[21] Appl. No.: 908,621

[22] Filed: May 23, 1978

[30] Foreign Application Priority Data

May 24, 1977 [JP] Japan .................................. 52-60238

[51] Int. Cl.² ............................ G03B 1/18; H02J 7/00
[52] U.S. Cl. ..................................... 354/173; 307/81; 320/15
[58] Field of Search ..................... 354/173, 171, 60 R; 318/139; 307/48, 52-54, 80, 81; 320/15; 242/71.5; 352/121, 137, 169

[56] References Cited

U.S. PATENT DOCUMENTS

| 3,448,670 | 6/1969 | Suzuki | 354/173 |
| 3,710,705 | 1/1973 | Kimura | 354/173 X |
| 3,840,884 | 10/1974 | Umeda | 354/173 X |
| 4,101,787 | 7/1978 | Vail | 320/15 X |

Primary Examiner—L. T. Hix
Assistant Examiner—William B. Perkey
Attorney, Agent, or Firm—McGlew and Tuttle

[57] ABSTRACT

The apparatus comprises a power supply switching device for switching a different battery into circuit connection with a driving motor of the apparatus responsive to completion of each photographing cycle. In one embodiment, the power supply switching is effected by a rotary switch and, in the other embodiment, it is effected by a flip-flop circuit and transistors. The apparatus is capable of effecting film winding either at a high speed or at a low speed and, with high speed operation, all batteries are switched into circuit connection with the motor and the switching of different batteries into circuit connection with the motor is effective only at low speed operation of the film winding apparatus. The finish of each photographic cycle may be determined by the completion of winding of a respective frame of the film or by the completion of each shutter operation.

10 Claims, 5 Drawing Figures

MOTOR-OPERATED FILM WINDING APPARATUS

BACKGROUND OF THE INVENTION

The present invention relates to motor-operated film winding apparatus for use with cameras in general and more particularly to an improved motor-operated film winding apparatus in which the degrading of power-supply performance is obviated.

Recently, there has been widely used film winding apparatus of the type operated by a motor, in which the motor is operated at a high speed with a high voltage applied to the motor when the film is wound continuously and, when the film is wound frame by frame, a low voltage is applied to the motor to operate the motor at a low speed, by switching the potential of the power source for the motor appropriately.

Conventionally, such switching of the potential of the power source is accomplished by utilizing a different number of batteries in each case. To be more specific, a high potential is obtained by utilizing all the batteries of the power source and a low potential is obtained by utilizing some limited number of particular batteries out of all the batteries.

However, when the batteries are used in the above-mentioned manner, such particular batteries tend to be exhausted more so that the internal resistances of the particular batteries increase. As a result, when the batteries having increased internal resistances are connected in series with the other batteries in order to turn the motor at a high speed, the total potential of the batteries is limited by the batteries having such increased internal resistances and this shortens the life of all the batteries employed in the camera.

SUMMARY OF THE INVENTION

It is therefore a general object of the present invention to provide a motor-operated film winding apparatus in which the exhausting of particular batteries, more than other batteries during the life of the batteries, is obviated.

Another object of the invention is to provide a power supply switching means, to attain the abovementioned object, which is capable of switching a different battery into circuit connections with the motor responsive to completion of each photographing cycle.

According to the invention, one embodiment of motor-operated film winding apparatus employs a power supply switching means comprising a rotary switch which connects the batteries one by one to the motor of the film winding apparatus whenever a single photographing cycle is finished. The photographing cycle is determined either by the finish of the winding of each frame of the film or by the finish of each shutter operation.

In another embodiment of the invention, the power supply switching means comprises two transistors and a flip-flop circuit. The respective transistors are connected to the respective batteries, and the respective batteries are connected to the motor alternately by the flip-flop circuit, which is inverted whenever a single photographing cycle is finished.

BRIEF DESCRIPTION OF THE DRAWINGS

The foregoing and other feature of the invention will be more apparent from a further reading of the specification and claims and from the drawings in which:

FIG. 1 (b) is a schematic sectional side view of a rotary switch to be employed in the film winding apparatus of FIG. 1 (a).

FIG. 1 (c) shows a circuit diagram of the film winding apparatus of FIG. (a).

DETAILED DESCRIPTION OF THE PREFERRED EMBODIMENTS

Figure 1A:
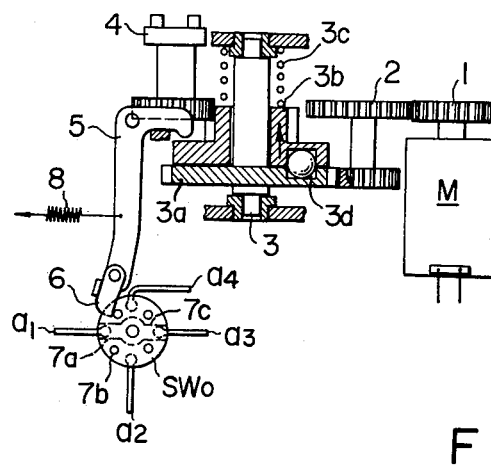
FIG. 1 (a) is a schematic sectional side view of a main portion of a film winding apparatus according to the invention.
Figure 1B:
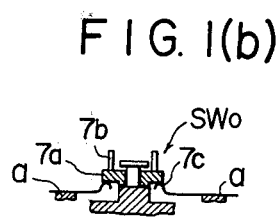
Figure 1C:
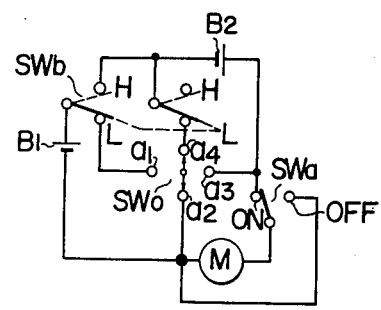

Referring to FIG. 1 (a), there is shown a schematic sectional side view of a main portion of an embodiment of film winding apparatus for use with a camera according to the invention. FIG. 1 (b) partially shows a rotary switch to be employed in the film winding apparatus of FIG. 1 (a), and FIG. 1 (c) shows a circuit diagram for the film winding apparatus of FIG. 1 (a).

In FIG. 1 (a), reference numeral 1 represents a gear mounted on the driving shaft of a motor M. The gear 1 engages with an intermediate gear 2 so that it is connected to the driving side of a known ball sliding joint means 3. The ball sliding joint means 3 comprises a driving member 3a and a driven member 3b, which are in pressure contact with each other by spring means 3c, and a ball 3d disposed between the driving member 3a and the driven member 3b. At the position shown in FIG. 1 (a), one cycle of film winding operation is finished and a coupler 4 is stopped, but the motor M is not stopped. Therefore, an excessive load is applied to the driven member 3b so that the ball 3d is disengaged from a predetermined position of the driving member 3a. As a result, the driven member 3b is moved upwards in the axial direction of the driven member 3b as indicated by the arrow, moving away from the driving member 3a against the bias of the spring means 3c so that the rotating force of the driving means 3a is no longer transmitted to the driven member 3b. The driven member 3b of the ball sliding joint means 3 is connected to the coupler 4 to be connected to a film driving shaft (not shown) of the camera and applies the rotating force of the driving plate 3a to the film driving shaft so as to wind a film by one frame. The driven member 3b is disengaged from the driving member 3b whenever the film is wound by one frame. The completion of the winding of one frame of film and the disengagement of driven member 3b may be considered to be the completion of one photographic cycle of the camera. It is well known, however, that different cameras have different photographic cycles which may end with a shutter release or other function.

The movement of the driven member 3b in the axial direction thereof is transmitted to a rotary switch SW$_O$ through a lever 5 so that the switch SW$_O$ is turned. To be more specific, when the driven member 3b is moved in the axial direction thereof, the lever 5 is turned counterclockwise in FIG. 1 (a) against the bias of a spring 8. At the end of the rotary lever 5, there is provided a ratchet pawl 6. By the ratchet pawl 6 engaged with a pin 7b of a rotary disk 7a of the switch $SW_O$, the rotary disk 7a is rotated clockwise by one step so that a rotary contact 7c disposed on the back side of the rotary disk 7a is caused to meet one pair of stationary contacts $a_1$ and $a_3$ or the other pair of stationary contacts $a_2$ and $a_4$.

Referring to FIG. 1 (c), whenever the film winding is performed frame by frame, the switch $SW_O$ is turned step by step. Assuming that a power source switch SWa is on and a speed choice switch SWb is set for "low speed," an electric current is supplied to the motor M from either a battery $B_1$ or a battery $B_2$. As shown in FIG. 1 (c), the rotary switch $SW_O$ is in the position for connecting the contact $a_2$ to the contact $a_4$, current flows to the motor M from the battery $B_2$, and when the contact $a_1$ is connected to the contact $a_3$ by the rotary switch $SW_O$, current flows to the motor M from the battery $B_1$. When the film is wound by one frame, the power source switch SWa is turned off by switching means (not shown) so that the motor M is stopped.

When the speed choice switch SWb is set for "high speed," current is supplied to the motor M from both batteries $B_1$ and $B_2$ connected in series. In this case, the switching operation of the rotary switch $SW_O$ is also performed, but it becomes irrelevant to the operation of the speed choice switch SWb since the circuit of the rotary switch $SW_O$ is disconnected from the speed choice switch SWb, and the film is wound continuously. By opening the power source switch SWa by the switching means (not shown), the motor M is stopped.

Figure 2:
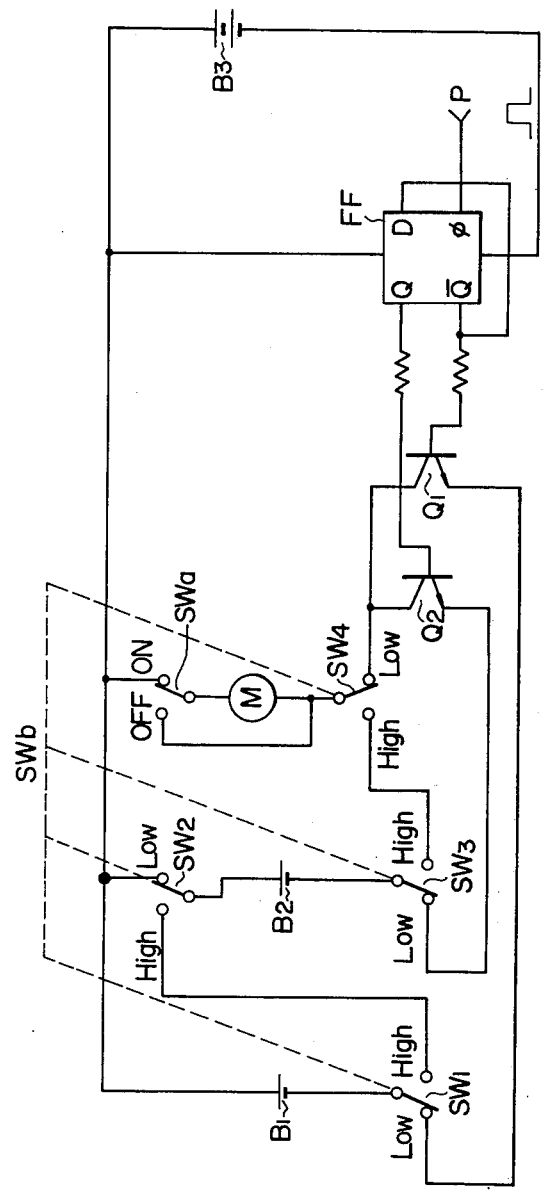
FIG. 2 shows a circuit diagram of another embodiment of film winding apparatus according to the invention.

FIG. 2 is a circuit diagram of another embodiment of the invention, in which the switches in FIG. 1 (c) are replaced by a flip-flop FF and transistors $Q_1$ and $Q_2$. In this embodiment, when the speed choice switch SWb is set for "low speed" and the power source switch SWa is turned on, the batteries $B_1$ and $B_2$ are connected to the motor M via the transistors $Q_1$ and $Q_2$ and the switch SW4. The transistors $Q_1$ and $Q_2$ are connected to two output terminals Q and Q of the flip-flop FF, respectively, and whenever the flip-flop FF is inverted, one terminal thereof which has been on is turned off, while the other terminal thereof which has been off is turned on. The flip-flop FF is inverted whenever a shutter operation finish signal P is applied to an input terminal $\phi$ of the flip-flop FF. Reference character $B_3$ indicates a power source of the flip-flop FF.

On the other hand, when the speed choice switch SWb is set for "high speed," the batteries $B_1$ and $B_2$ are directly connected to the motor M so that the motor is immediately rotated when the power source switch SWa is turned on. In this case, the flip-flop FF is operated corresponding to the signal P, but the transistors $Q_1$ and $Q_2$ are disconnected from the batteries $B_1$ and $B_2$ and the motor M by the switch SW4.

Figure 3:
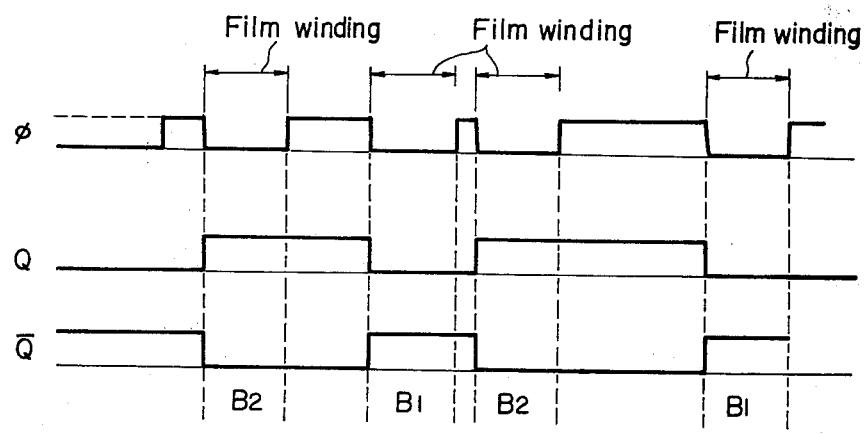
FIG. 3 shows a time chart of the signals applied to a flip-flop circuit and the manner of use of the batteries in the embodiment of FIG. 2.

FIG. 3 shows a time chart of the signals applied to the input terminal $\phi$ and to the output terminals Q and Q of the flip-flop FF, including the time chart indicating how the batteries $B_1$ and $B_2$ are used in the embodiment of FIG. 2 when the speed choice switch SWb is set for "low speed." In this case, the flip-flop is inverted whenever the signal applied to the input terminal, $\phi$, falls to zero and, at the same time, the batteries $B_1$ and $B_2$ are used alternately.

In the above-mentioned embodiment, two batteries are used at a time at the "high speed" and the two batteries are alternately used at the "low speed." However, when three or more batteries are employed at a time at the "high speed," this apparatus can be designed so as to divide the batteries into three or more groups and use each battery or each group of the batteries successively at the "low speed."

In the above-mentioned two embodiments, the switching of the use of the batteries is performed whenever the film winding operation is finished and the flip-flop and the transistors are operated whenever the shutter operation is finished. However, any combination of these operations can be employed.

In the embodiment of FIGS. 1 (a), 1 (b) and 1 (c), the ball sliding joint means is employed, but any means can be employed if its action is equivalent to that of the sliding ball clutch.

While specific embodiments of the invention have been shown and described in detail to illustrate the application of the principles of the invention, it will be understood that the invention may be embodied otherwise without departing from such principles.

What is claimed is:

1. In a motor-operated film winding apparatus for use with cameras of the type operable through a plurality of photographic cycles and having a film winding member for winding a film therearound, a motor for driving the film winding member, and a power source, for the motor-operated film winding apparatus, comprising at least two batteries and convertible into a high voltage power source and a low voltage power source by switching different numbers of batteries into circuit connection with the motor, in use, the improvement comprising:

film winding speed switching means operable to set the winding speed of the film at one of two preset speeds consisting of a high speed and a low speed, and power supply switching means operable to switch a different battery into circuit connection with said motor, responsive to and at the completion of each photographic cycle, said power supply switching means being operated only when the winding speed of the film is set at the low speed by said film winding speed switching means.

2. A motor-operated film winding apparatus as claimed in claim 1, wherein each of said photographing cycles is determined by the finish of the winding of each frame of the film.

3. A motor-operated film winding apparatus as claimed in claim 1, wherein each of said photographing cycles is determined by the finish of each shutter operation.

4. A motor-operated film winding apparatus as claimed in claim 1, including drive transmission means for selectively transmitting the driving force of said motor to said film winding member, said drive transmission means comprising a ball sliding joint means including a driving disk secured to a shaft, a driven disk rotatably mounted on the shaft, and a ball sliding member disposed between said driving disk and said driven disk, said driving disk being rotated by said motor, and means biasing said driving disk into pressure contact with said driven disk so that, when the load applied to said driving disk by said driven disk reaches a predetermined value, said driven disk is feed from said driving disk by said ball sliding member;

a coupler connected to said film winding member and rotated by said driven disk; and detecting means operable to detect the disengagement of said driven disk from said driving disk and to transmit the disengagement movement to said power supply switching means.

5. A motor-operated film winding apparatus as claimed in claim 1, wherein said power supply switching means comprises a rotary switch having plural pairs of stationary contacts with each pair being connected to a respective battery, and a rotary contact selectively engageable with said pairs of stationary contacts.

6. A motor-operated film winding apparatus as claimed in claim 4, wherein said power supply switching means comprises a rotary switch having plural pairs of stationary contacts spaced angularly from each other, each pair being connected to a respective battery, a rotary contact selectively engageable with said pairs of stationary contacts; said detecting means comprising a pivoted lever having a ratchet pawl at one end thereof operable to rotate said rotary contact step by step.

7. In a motor-operated film winding apparatus for use with cameras of the type capable of completing a plurality of photographic cycles and having a film winding member for winding a film therearound, a motor for driving the film winding member, and a power source, for the motor-operated film winding apparatus, which comprises at least two batteries and is capable of constituting a high voltage power source, by connecting said batteries in series with said motor, and a low voltage power source connecting less than the full member of said batteries in series with said motor, the improvement comprising:

film winding speed switching means operable to set the winding speed of the film at one of two preset speeds consisting of a high speed and a low speed, and power supply switching means operable to switch a different battery into circuit connection with said motor responsive to completion of each photographic cycle, said power supply switching means comprising plural transistors, each connected to a respective battery, and flip-flop circuit means operable to connect a different one of said batteries to said motor through the associated transistor responsive to and at the completion of photographing cycle.

8. A motor-operated film winding apparatus as claimed in claim 7, wherein said power supply switching means is operated only when the winding speed of the film is set at the low speed by said film winding speed switching means.

9. A motor-operated film winding apparatus as claimed in claim 7, wherein each of said photographing cycle is determined by the finish of the winding of each frame of the film.

10. A motor-operated film winding apparatus as claimed in claim 7, wherein each of said photographing cycles is determined by the finish of each shutter operation.

* * * * *